United States Patent
Liu

(10) Patent No.: US 9,459,430 B2
(45) Date of Patent: Oct. 4, 2016

(54) WIDE-ANGLE DEPTH IMAGING LENS CONSTRUCTION

(75) Inventor: Zhiqiang Liu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 418 days.

(21) Appl. No.: 13/425,157

(22) Filed: Mar. 20, 2012

(65) Prior Publication Data

US 2013/0250039 A1 Sep. 26, 2013

(51) Int. Cl.
| | | |
|---|---|---|
| *G02B 13/18* | (2006.01) | |
| *H04N 5/30* | (2006.01) | |
| *G02B 13/04* | (2006.01) | |
| *H04N 5/225* | (2006.01) | |
| *H04N 5/33* | (2006.01) | |
| *G01B 11/00* | (2006.01) | |
| *H04N 13/02* | (2006.01) | |
| *G01B 11/22* | (2006.01) | |
| *G02B 13/00* | (2006.01) | |
| *G02B 13/22* | (2006.01) | |
| *G02B 7/02* | (2006.01) | |

(52) U.S. Cl.
CPC .............. *G02B 13/04* (2013.01); *G01B 11/00* (2013.01); *G01B 11/22* (2013.01); *G02B 13/008* (2013.01); *G02B 13/0045* (2013.01); *G02B 13/22* (2013.01); *H04N 5/2254* (2013.01); *H04N 5/33* (2013.01); *H04N 13/0271* (2013.01); *G02B 7/028* (2013.01)

(58) Field of Classification Search
CPC ...................... H04N 5/23238; H04N 5/23293; H04N 5/225; H04N 5/232; H04N 5/23232; H04N 5/2624; H04N 7/183; H04N 13/0203; H04N 13/0239; H04N 5/217; H04N 5/2258; H04N 5/23216; H04N 5/247; H04N 7/18; H04N 7/181; H04N 13/0207
See application file for complete search history.

(56) References Cited

U.S. PATENT DOCUMENTS

| | | | |
|---|---|---|---|
| 4,403,837 | A | 9/1983 | Nakahashi |
| 4,738,496 | A | 4/1988 | Canzek |
| 5,311,611 | A | 5/1994 | Migliaccio |

(Continued)

FOREIGN PATENT DOCUMENTS

| | | |
|---|---|---|
| CN | 102033302 A | 4/2011 |
| CN | 201984202 U | 9/2011 |

(Continued)

OTHER PUBLICATIONS

Machine level English translation of Etsuro (JP 2002-098887 A).*

(Continued)

*Primary Examiner* — Tracy Li
*Assistant Examiner* — Mohammad J Rahman
(74) *Attorney, Agent, or Firm* — Gregg Wisdom; Judy Yee; Micky Minhas

(57) ABSTRACT

Embodiments are disclosed herein related to the construction of optical elements for depth sensor systems. One disclosed embodiment provides a wide-angle lens construction comprising a first, negative stage, and a second, positive stage positioned behind the first, negative stage along an optical axis of the lens construction. The second, positive stage further comprises a first positive lens substage, a second positive lens substage, a third positive lens substage, the second positive lens substage positioned between the first positive lens substage and the third positive lens substage.

20 Claims, 5 Drawing Sheets

(56) References Cited

U.S. PATENT DOCUMENTS

| | | | | |
|---|---|---|---|---|
| 5,703,725 A * | 12/1997 | Aoki | | 359/683 |
| 6,014,265 A * | 1/2000 | Kato | | G02B 15/16 |
| | | | | 359/676 |
| 6,091,551 A * | 7/2000 | Watanabe | | 359/676 |
| 6,292,293 B1 | 9/2001 | Chipper | | |
| RE38,465 E * | 3/2004 | Matsuzawa | | G02B 9/62 |
| | | | | 359/649 |
| 7,002,154 B2 | 2/2006 | Wellman et al. | | |
| 7,167,319 B1 * | 1/2007 | Chang et al. | | 359/686 |
| 7,286,304 B1 * | 10/2007 | Ohtake | | G02B 15/173 |
| | | | | 359/686 |
| 2001/0024332 A1 * | 9/2001 | Mori | | G02B 13/04 |
| | | | | 359/755 |
| 2002/0163736 A1 * | 11/2002 | Endo | | 359/686 |
| 2003/0138245 A1 * | 7/2003 | Watanabe | | 396/72 |
| 2006/0036396 A1 * | 2/2006 | Brown | | 702/141 |
| 2006/0190419 A1 * | 8/2006 | Bunn et al. | | 706/2 |
| 2006/0256429 A1 * | 11/2006 | Obrebski | | G02B 3/14 |
| | | | | 359/380 |
| 2008/0088944 A1 * | 4/2008 | Watanabe | | 359/687 |
| 2008/0180811 A1 * | 7/2008 | Nishimura | | 359/692 |
| 2008/0198478 A1 * | 8/2008 | Yanai et al. | | 359/691 |
| 2009/0002840 A1 * | 1/2009 | Shirota | | 359/683 |
| 2009/0067041 A1 * | 3/2009 | Izumi | | 359/356 |
| 2010/0044555 A1 | 2/2010 | Ohara et al. | | |
| 2010/0172030 A1 * | 7/2010 | Yamano | | G02B 27/646 |
| | | | | 359/686 |
| 2010/0194853 A1 | 8/2010 | Matsusaka et al. | | |
| 2010/0246031 A1 | 9/2010 | Caldwell | | |
| 2010/0265380 A1 * | 10/2010 | Fukuta | | G02B 15/177 |
| | | | | 348/335 |
| 2011/0080659 A1 * | 4/2011 | Kurashige | | 359/770 |
| 2011/0102541 A1 * | 5/2011 | Jin et al. | | 348/36 |
| 2012/0050884 A1 * | 3/2012 | Kurashige et al. | | 359/684 |
| 2012/0188653 A1 * | 7/2012 | Shimada | | 359/689 |

FOREIGN PATENT DOCUMENTS

| | | | |
|---|---|---|---|
| JP | 10-213742 | A | 8/1998 |
| JP | 2000002835 | A | 1/2000 |
| JP | 2002-098887 | A | 4/2002 |
| JP | 2002-228925 | A | 8/2002 |
| JP | 2003149546 | A | 5/2003 |
| JP | 2008008960 | A | 1/2008 |
| JP | 2010-134416 | A | 6/2010 |

OTHER PUBLICATIONS

AshpericLens, Wikipedia.*
LensBasics, Canon.*
"International Search Report", Mailed Date: May 30, 2013, Application No. PCT/US2013/029459, Filed date: Mar. 6, 2013, pp. 10.
Curatua, et al., "Using Molded Chalcogenide Glass Technology to Reduce Cost in a Compact Wide-angle Thermal Imaging Lens", Retrieved at <<http://www.lightpath.com/literature/technicalPapers/MoldedChalcogenideGlassTechnology.pdf>>, Apr. 17, 2006, pp. 8.
European Patent Office, Supplementary Search Report Issued in European Patent Application No. 13764916.6, Mar. 26, 2015, Germany, 3 Pages.
European Patent Office, Office Action Issued in European Patent Application No. 13764916.6, Apr. 13, 2015, Germany, 6 Pages.
The State Intellectual Property Office of China, First Office Action and Search Report Issued in Chinese Patent Application No. 201380015336.9, Dec. 3, 2015, China, 15 pages.
The State Intellectual Property Office of China, Second Office Action issued in Chinese Patent Application No. 201380015336.9, Jul. 15, 2016, China, 10 pages.

* cited by examiner

WIDE-ANGLE DEPTH IMAGING LENS CONSTRUCTION

BACKGROUND

Image-based depth sensors may be used in a variety of different environments. For example, an image-based depth sensor may be used with an interactive entertainment system to allow players to interact with the entertainment system through the use of bodily gestures alone, without the use of hand-held motion sensors or the like to detect the gestures.

Image-based depth sensors may utilize various technologies, including but not limited to time-of-flight and structured light depth sensing technologies, to determine depth from image data. In either case, where transfer of an image to an image sensor is affected by such factors as thermal expansion of the optical system, errors in depth sensing may arise.

SUMMARY

Embodiments are disclosed herein that relate to wide-angle, high speed infrared imaging lens assemblies for an infrared depth imaging system. For example, one disclosed embodiment provides a depth sensing system comprising a lens construction having a first, negative stage, and a second, positive stage positioned behind the first, negative stage along an optical axis of the lens construction. The second, positive stage comprises a first positive lens substage, a second positive lens substage, and a third positive lens substage, wherein the second positive lens substage is positioned between the first positive lens substage and the third positive lens substage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments are disclosed that relate to optical elements for an image-based depth sensing system in such a manner as to facilitate image sensing in light starving, wide-angle applications. Briefly, the disclosed embodiments may provide a relatively lower relative aperture (f/#) and wider field of view than conventional retro-focus lens constructions. In some embodiments, an f-number less than or equal to 1.0 and a field of view (FoV) greater than or equal to 90° may be achieved. Further, some embodiments provide telecentricity that may help to maintain the size of the image even as a sensing element is moved due to thermal expansion.

Figure 1A:
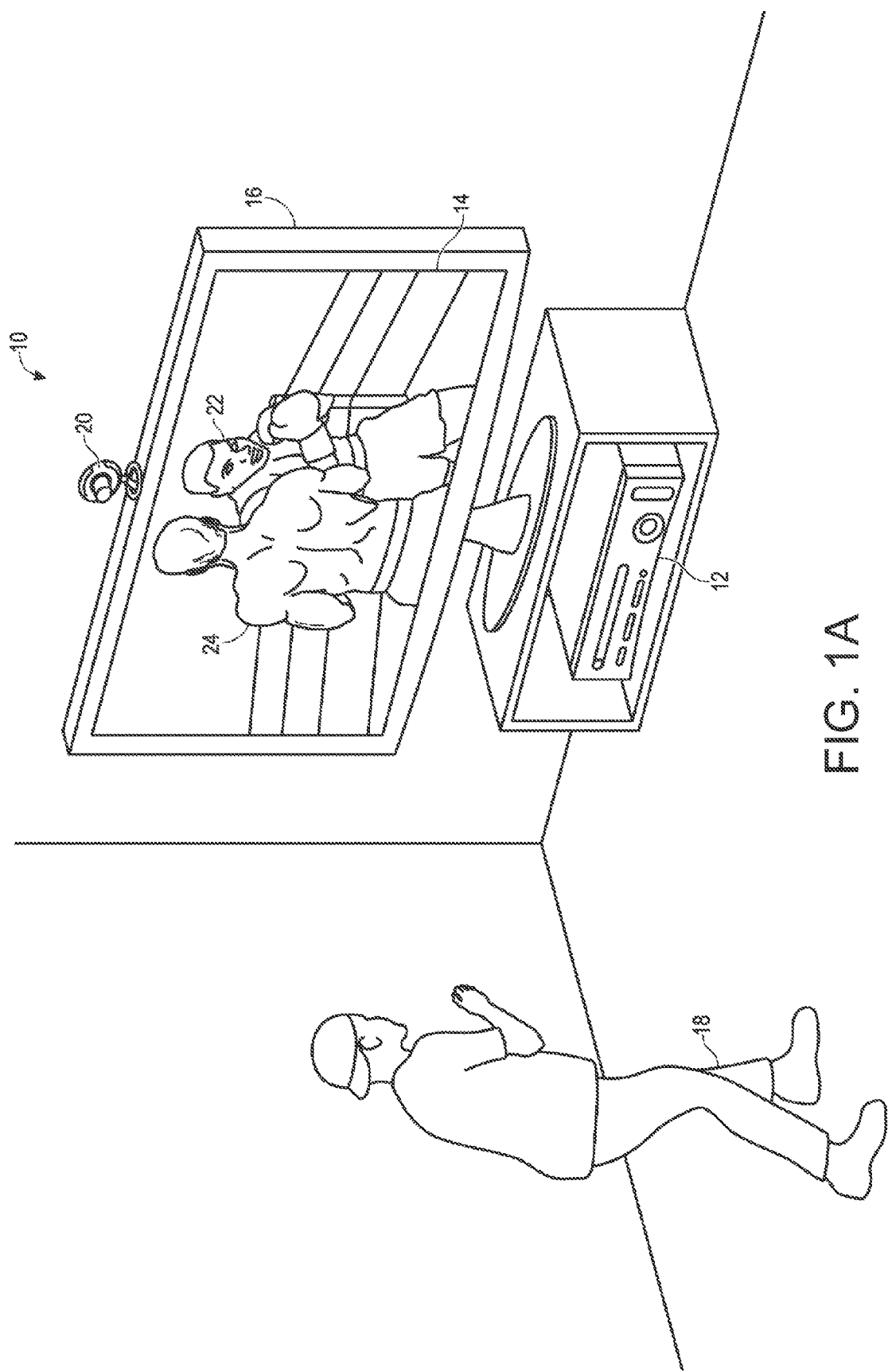
FIG. 1A shows an example embodiment of a computing system including a depth camera tracking a game player playing a boxing game.

FIG. 1A shows one non-limiting example of a depth sensing camera system 10. In particular, FIG. 1A shows a computer gaming system 12, that may be used to play a variety of different games, play one or more different media types, and/or control or manipulate non-game applications. FIG. 1A also shows a display 14, such as a high-definition television, which may be used to present game visuals to game players, such as game player 18. Furthermore, FIG. 1A shows a capture device in the form of depth camera 20, which may be used to visually monitor one or more game players, such as game player 18. For instance, depth camera 20 may be a wide-angle high speed infrared depth camera device. The example shown in FIG. 1A is non-limiting. As described below, a variety of different types of depth sensing systems may be used without departing from the scope of this disclosure.

A target tracking system may be used to recognize, analyze, and/or track one or more targets, such as game player 18. FIG. 1A shows a scenario in which game player 18 is tracked using depth camera 20 so that the movements of game player 18 may be interpreted by gaming system 12 as controls that can be used to affect the game being executed by gaming system 12. In other words, game player 18 may use his movements to control the game. The movements of game player 18 may be interpreted as virtually any type of game control.

Figure 1B:
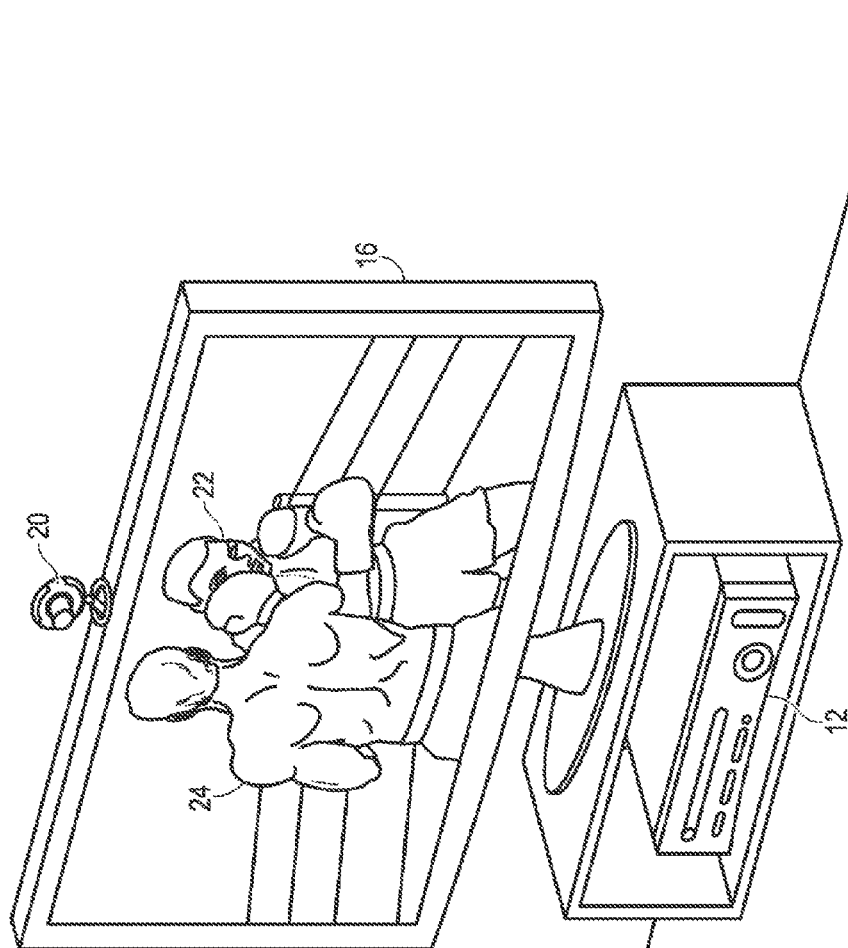
FIG. 1B shows the game player of FIG. 1A throwing a punch that is tracked and interpreted as a game control that causes a player avatar to throw a punch in a game space of the boxing game.
Figure 1B:
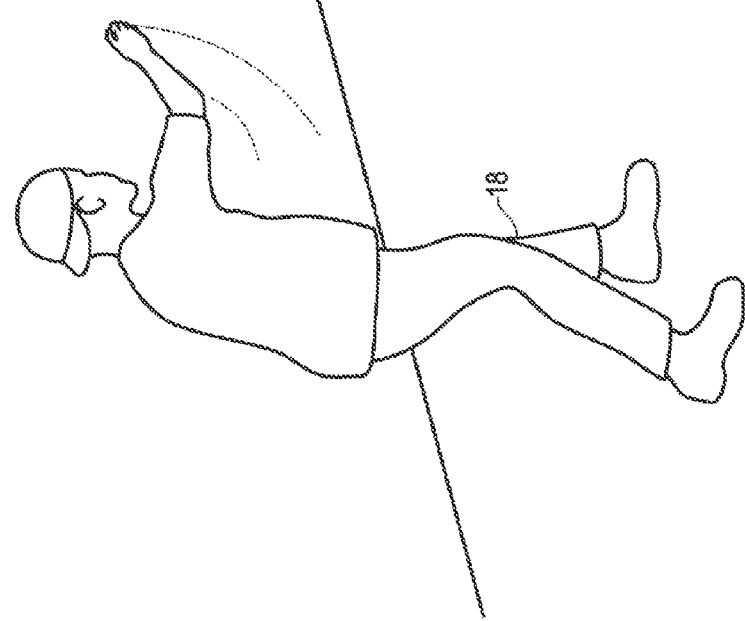

The example scenario illustrated in FIG. 1A shows game player 18 playing a boxing game that is being executed by gaming system 12. The gaming system uses display 14 to visually present a boxing opponent 22 to game player 18. Furthermore, the gaming system uses display 14 to visually present a player avatar 24 that game player 18 controls with his movements. As shown in FIG. 1B, game player 18 can throw a punch in physical/world space as an instruction for player avatar 24 to throw a punch in game/virtual space. Gaming system 12 and depth camera 20 can be used to recognize and analyze the punch of game player 18 in physical space so that the punch can be interpreted as a game control that causes player avatar 24 to throw a punch in game space. For example, FIG. 1B shows display 14 visually presenting player avatar 24 throwing a punch that strikes boxing opponent 22 in response to game player 18 throwing a punch in physical space. However, a plurality of movements may be detected and interpreted as a plurality of different game or application controls.

Target tracking systems may be used to interpret target movements as operating system and/or application controls. Any suitable controllable aspect of an operating system and/or application, such as the boxing game shown in FIGS. 1A and 1B, may be controlled by movements of a target, such as game player 18. The illustrated boxing scenario is provided as an example, but is not meant to be limiting in any way. To the contrary, the illustrated scenario is intended to demonstrate a general concept, which may be applied to a variety of different applications without departing from the scope of this disclosure.

Figure 2:
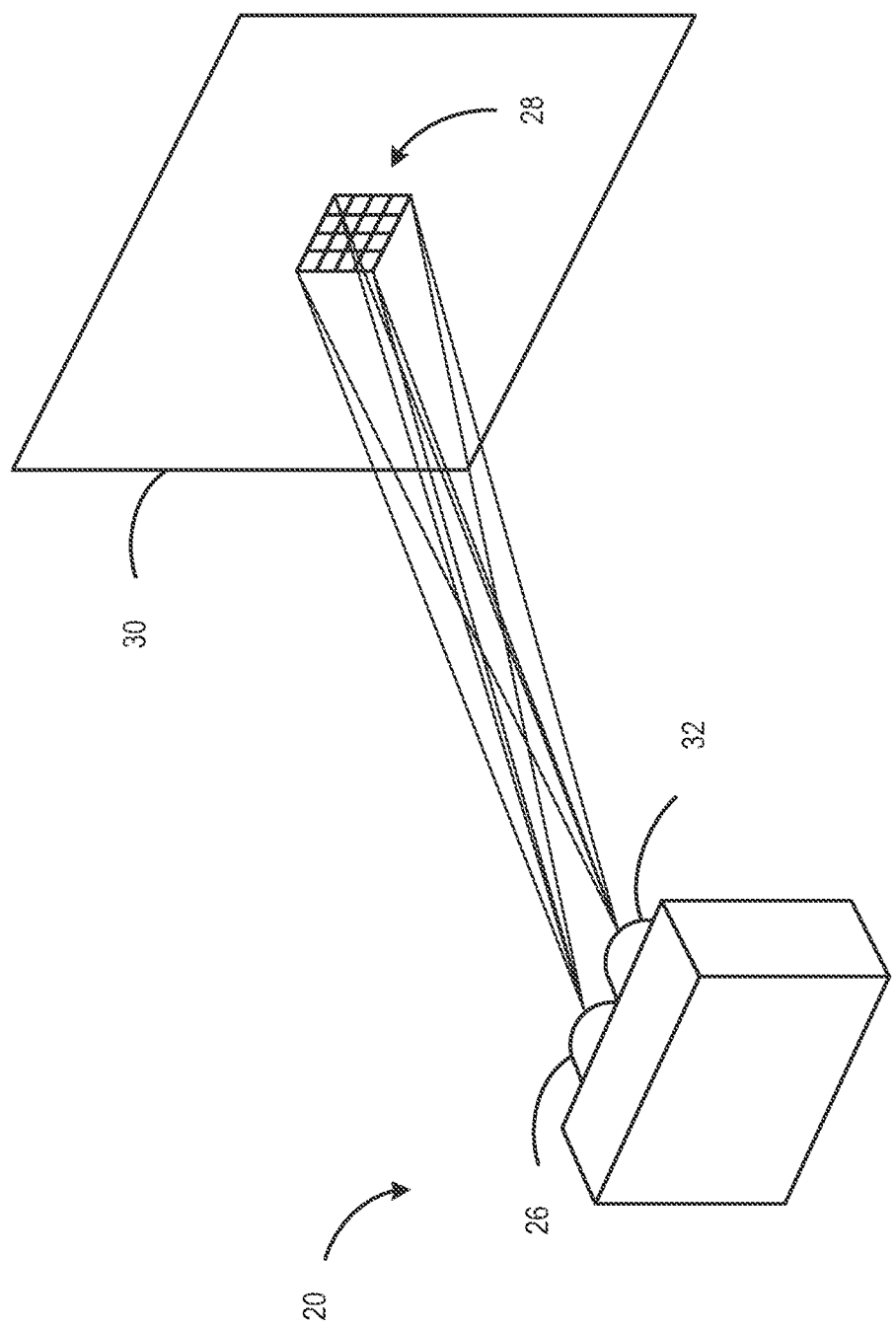
FIG. 2 shows a schematic depiction of an embodiment of a depth camera.

Turning now to FIG. 2, depth camera 20 is schematically shown as comprising a projector assembly 26 configured to project light 28 to illuminate a target 30, and a lens construction 32 configured to focus light reflected by target 30 onto a sensor. Image data from the sensor may be analyzed to determine depth information regarding target 30. Depth camera 20 may utilize time-of-flight, structured light, and/or any other suitable depth sensing technology. While the projector assembly 26 and the lens construction 32 are depicted as being located within a single body, it will be understood that these components also may be located within separate bodies, and may have any other suitable configuration than that shown.

Figure 3:
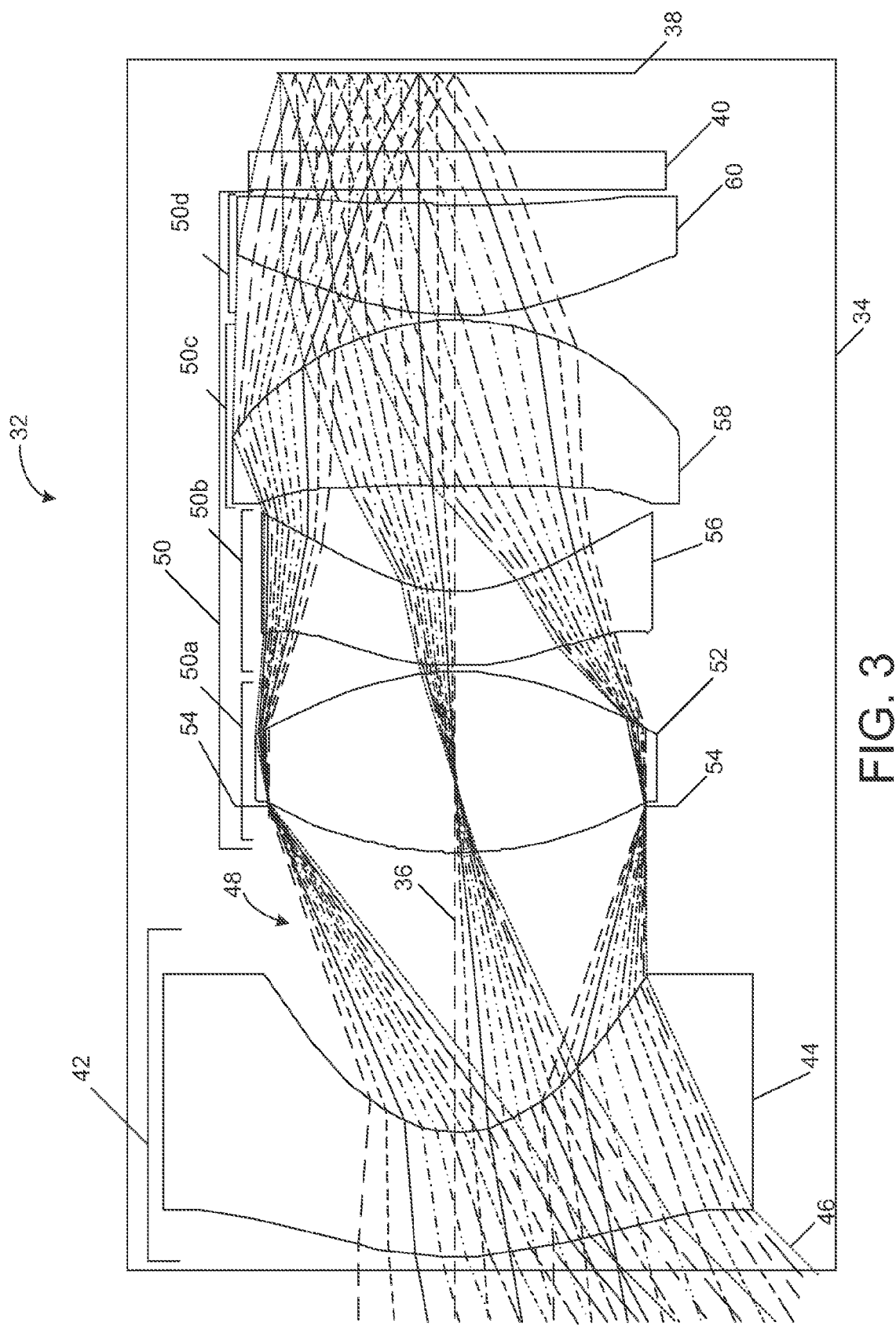
FIG. 3 shows a schematic diagram of an embodiment of a lens construction for use with a depth camera.

FIG. 3 shows an embodiment of lens construction 32 of FIG. 2. Lens construction 32 comprises a housing 34 that houses a plurality of optical components that are arranged along an optical axis 36 and configured to focus an image on an image sensor 38 for depth analysis. Image sensor 38 may comprise any suitable type of image sensor, including but not limited to a CMOS sensor, and is configured to acquire an image of projected light as reflected from target 30 to determine a depth profile of target 30.

In the depicted embodiment, the lens construction 32 comprises two lens stages (described in more detail below), and also a band-pass filter 40 disposed between the sensor 38 and the scene being imaged to reduce the amount of ambient light reaching image sensor 38. In the depicted embodiment, band-pass filter 40 is positioned immediately adjacent to image sensor 38 along optical axis 36 to filter ambient light at a location close to the image sensor. In other embodiments, the band-pass filter may have any other suitable location.

Continuing with FIG. 3, a first, negative lens stage 42 is positioned at the front of the lens construction along optical axis 36. As used herein, the term "front" describes a position along optical axis 36 that is closest to a scene being imaged, and the term "rear" describes a position along optical axis 36 that is closest to sensor 38. Further, the terms "negative" and "positive" as used with reference to the lens stages and lens substages refer to optical power.

The depicted first, negative lens stage 42 includes a first negative lens element 44. The depicted first negative lens element 44 comprises a convex front portion configured to bend incoming rays 46 and to decrease angles between the chief rays and optical axis 36. The term "chief ray" signifies the center ray within the ray bundle from each different field location. First negative lens element 44 also comprises a concave rear portion configured to diverge ray bundles 48. While a single lens is depicted for each lens element in FIG. 3, it will be understood that, in other embodiments, each lens element may comprise plural lenses that, when combined, have the respective optical characteristics described herein for each lens element, and that the term "element" as used herein also refers to such plural lens arrangements.

A second, positive lens stage 50 is positioned behind the first, negative lens stage 42 relative to a scene being imaged. The second, positive lens stage 50 focuses the diverging ray bundles 48 onto the sensor plane 38. The depicted second, positive lens stage 50 comprises a first positive lens substage 50a, a negative lens substage 50b, a second positive lens substage 50c, and a third positive lens substage 50d in order along optical axis 36. First positive lens substage 50a as depicted comprises a first positive lens element 52, which has a convex front portion and a convex rear portion to focus the diverging ray bundles 48, thereby converging the ray bundles 48. First positive lens element 52 is a stronger positive lens element than the remaining elements of the lens construction.

It is noted that the aperture stop 54 of the lens construction 32 is positioned between first negative lens element 44 and first positive lens element 52 to control light collection at the second, positive lens stage. Positioning aperture stop 54 at this location may help reduce the height of rays 46 entering first negative lens element 44 in order to reduce the size of the first negative lens element 44.

Negative lens substage 50b comprises a second negative lens element 56. Second negative lens element 56 includes a convex front portion that bends incoming ray bundles 48 from the first positive lens element 52 to make the ray bundles 48 less converging. Second negative lens element 56 also comprises a concave rear portion that additionally bends incoming chief rays to raise the ray heights on second positive lens element 58. This may help to decrease the overall length of the camera 20 by allowing a decreased separation between first positive lens element 52 and second positive lens element 58, and also may allow for the correction of field-dependent aberrations. For instance, second negative lens element 56, in addition to the other lens elements included in the lens construction, may be aspheric to correct for rays falling on the peripherals of lens surfaces. This may help to reduce optical aberrations, thereby helping to open up the aperture size of the lens construction. As mentioned above, second negative lens element 56 is weaker than first negative lens element 44, such that second negative lens element 56 bends incoming rays and ray bundles a lesser degree than first negative lens element 44.

Second positive lens substage 50c comprises a second positive lens element 58. Second positive lens element 58 comprises a concave front surface and a convex rear surface to gradually reduce the angle between chief rays and optical axis 36. Second positive lens element 58 also focuses ray bundles 48 down to tight spots on imaging sensor 38.

Third positive lens substage 50d comprises a third positive lens element 60, which comprises a convex front surface and a slightly concave rear surface. Similarly to second positive lens element 58, third positive lens element 60 continues to gradually reduce the angle between chief rays and optical axis 36 and focuses ray bundles 48 down to tight spots on sensor 38. In the depicted embodiment, filter 40 is positioned after the third positive lens element 60, and sensor 38 is positioned after the filter 40. However, in other embodiments filter 40 may have any other suitable location.

In some embodiments, second and third positive lens elements 58 and 60 may correct the chief ray angles and make the lens construction image-space telecentric, such that an exit pupil is located at infinity. This may allow the location of the centroid of an imaging spot on an image sensor to remain on a same location on the image sensor even if the lens construction defocuses, or the lens or sensor elements move in any way, such as with thermal expansion. It will be understood that, in some embodiments, second negative lens element 56 may be omitted. In such embodiments, the separation between the first positive lens element 52 and the second positive lens element 58 may be increased.

The embodiment of FIG. 3, which is drawn approximately to scale, represents one example configuration that may achieve an f-number less than or equal to 1.0 and a field of view (FoV) greater than or equal to 90 degrees. Such a combination of properties has heretofore been difficult to achieve, even with lens designs such as retro-focus and fisheye lenses. It will be understood that this example is intended to be illustrative and not limiting, as other specific configurations of the above-described stages and sub-stages likewise may achieve f-numbers and FoVs in such ranges.

The lens elements of the embodiment of FIG. 3 may be constructed in any suitable manner. For example, one or more lenses may be formed from plastic and/or glass. The use of more plastic materials may help to reduce materials and manufacturing costs, while the use of more glass materials may help to improve thermal stability.

Figure 4:
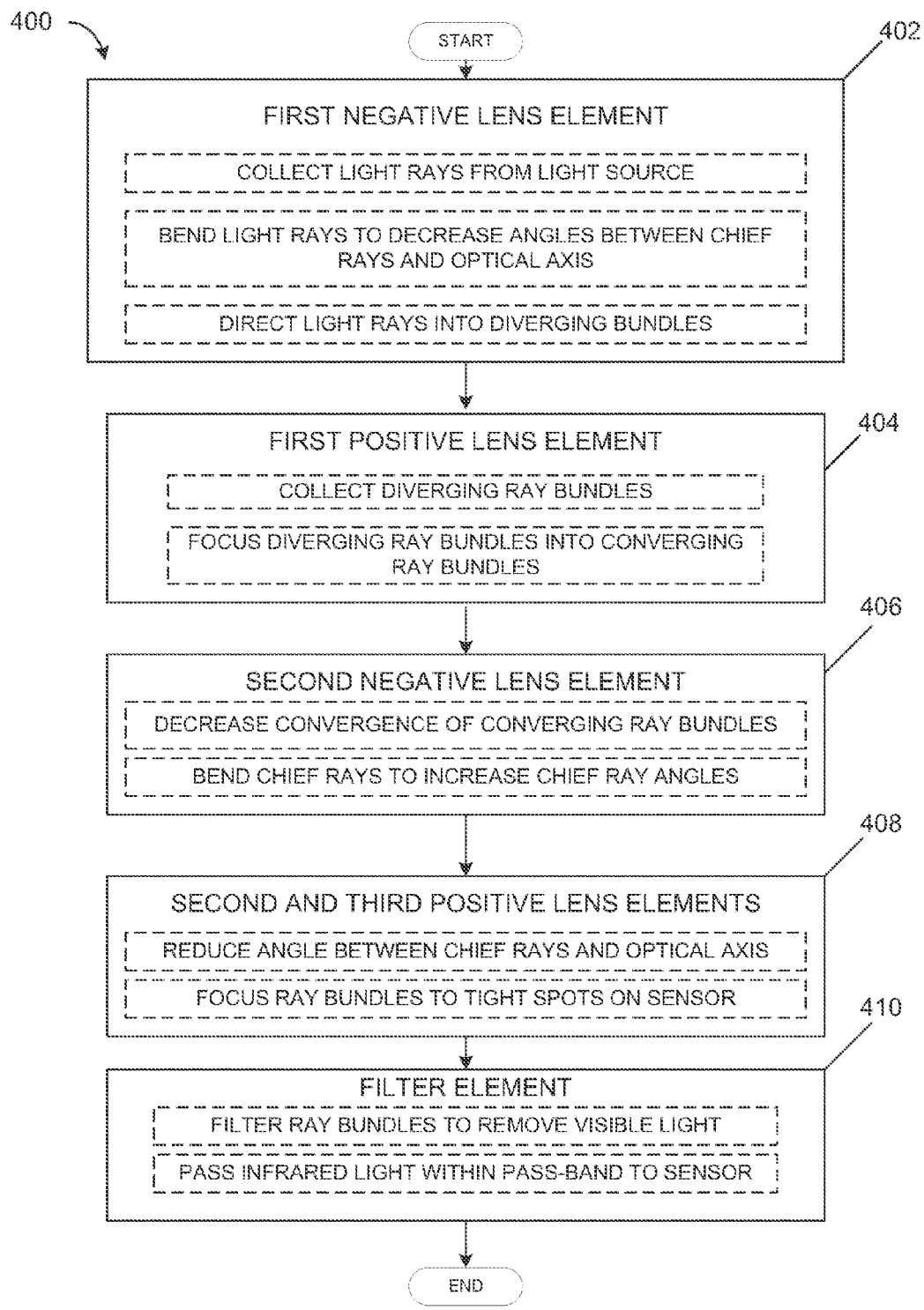
FIG. 4 is a flow diagram of an embodiment of a method of focusing an image on an image sensor via the lens construction of FIG. 3.

FIG. 4 shows an embodiment of a method 400 of focusing an image on an image sensor via the lens construction embodiment of FIG. 3. Method 400 comprises, at 402, utilizing a first negative lens element to collect light via a first negative lens element in a first, negative lens stage. The first negative lens element collects light rays from a light source, bends the light rays to decrease angles between the rays and an optical axis, and directs the light rays into diverging ray bundles.

Next, method 400 comprises, at 404, utilizing a first positive lens element in a second, positive lens stage to collect the diverging ray bundles, and focus the diverging bundles into converging ray bundles. At 406, method 400 comprises utilizing a second negative lens element to decrease a degree of convergence of the converging ray bundles and bend chief rays to increase chief ray angles. Then, at 408, method 400 comprises utilizing a second positive lens element and a third positive lens element to reduce an angle between the chief rays and the optical axis to focus the ray bundles to tight spots on a sensor element. As mentioned above, the second and third positive lens elements may make the lens construction telecentric, such that the location of the centroid of an imaging spot may remain approximately unchanged even when defocus occurs. Next, at 410, method 400 comprises utilizing a filter element to filter ray bundles from the third positive lens element to remove visible light, and pass infrared light within a pass-band through to the sensor element.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A wide-angle lens construction comprising:
a first, negative stage configured to collect light and direct rays into diverging bundles, the first, negative stage comprising a first negative lens element, the first negative lens element being an initial negative lens element in the lens construction and comprising an aspheric convex front portion and an aspheric concave rear portion; and
a second, positive stage positioned behind the first, negative stage along an optical axis of the lens construction, the second, positive stage comprising:
a first positive lens substage;
a second positive lens substage
a third positive lens substage the second positive lens substage positioned between the first positive lens substage and the third positive lens substage, and
a negative lens substage positioned between the first positive lens substage and the second positive lens substage, the negative lens substage comprising a convex front portion facing the first positive lens substage and a concave rear portion facing the second positive lens substage.

2. The wide-angle lens construction of claim 1, wherein the negative lens substage further comprises an aspheric convex front surface and an aspheric concave rear surface.

3. The wide-angle lens construction of claim 1, wherein each lens substage comprises one or more lens elements.

4. The wide-angle lens construction of claim 3, wherein the one or more lens elements comprises a lens element with an aspheric lens surface.

5. The wide-angle lens construction of claim 1, further comprising a band-pass filter positioned at a rear of the third positive lens substage, and a depth image sensor positioned at a rear of the band-pass filter.

6. The wide-angle lens construction of claim 1, wherein the second positive lens substage and the third positive lens substage are configured to make the lens construction image-space telecentric.

7. The wide-angle lens construction of claim 1, wherein an aperture stop is positioned between the first, negative stage and the second, positive stage.

8. The wide-angle lens construction of claim 1, wherein the first positive lens substage includes a stronger positive lens element than each remaining lens element of the lens construction.

9. The wide-angle lens construction of claim 1, wherein the lens construction comprises an f-number equal to or less than 1.0 and a field of view equal to or greater than 90 degrees.

10. A wide-angle, high speed infrared camera device comprising:
a lens construction comprising:
a first, negative stage, comprising a first negative lens element;
a second, positive stage, comprising, in order along an optical axis:
a first positive lens element,
a second negative lens element comprising a front convex portion and a rear concave portion,
a second positive lens element comprising a front concave surface facing the second negative lens element and a rear convex surface opposite the front concave surface, and
a third positive lens element;
a filter element positioned after the third positive lens element; and
a sensor positioned after the filter element.

11. The wide-angle, high speed infrared camera device of claim 10, wherein the second negative lens element comprises an aspheric front concave lens surface and an aspheric rear convex lens surface.

12. The wide-angle, high speed infrared camera device of claim 10, wherein the filter element comprises an infrared band-pass filter, and the sensor comprises a depth image sensor.

13. The wide-angle, high speed infrared camera device of claim 10, wherein the second positive lens element and the third positive lens element are configured to make the lens construction image-space telecentric.

14. The wide-angle, high speed infrared camera device of claim 10, wherein an aperture stop is positioned between the first, negative stage and the second, positive stage.

15. The wide-angle, high speed infrared camera device of claim 10, wherein the first positive lens element is a stronger positive lens element than each remaining lens element of the lens construction.

16. The wide-angle, high speed infrared camera device of claim 10, wherein the lens construction comprises an f-number equal to or less than 1.0, and a field of view (FoV) equal to or greater than 90 degrees.

17. A method of collecting light with an infrared camera device comprising a first, negative lens stage comprising a first negative lens element and a second, positive lens stage comprising a first positive lens element, a second negative lens element, a second positive lens element, and a third positive lens element, the method comprising:

via the first, negative lens stage, collecting light rays from a light source, bending the light rays to decrease angles between the rays and an optical axis, and diverging the light rays into diverging ray bundles; and via the second, positive lens stage collecting the diverging ray bundles and focusing the diverging bundles into converging ray bundles via the first positive lens element, decreasing the convergence of the converging ray bundles and bending chief rays to increase chief ray angles via the second negative lens element comprising a front aspheric convex portion and a rear aspheric concave portion, and reducing an angle between the chief rays and the optical axis and focusing the ray bundles to tight spots on a sensor element via the second positive lens element and the third positive lens element.

18. The method of claim 17, further comprising, with a filter element, filtering the ray bundles from the third positive lens element to remove visible light, and passing infrared light through to the sensor element.

19. The method of claim 18, wherein the infrared camera device comprises an f-number less than or equal to 1.0 and a field of view (FoV) greater than or equal to 90 degrees.

20. The method of claim 17, further comprising controlling light collection at the second, positive lens stage with an aperture stop positioned between the first, negative lens stage and the second, positive lens stage.

* * * * *